United States Patent [19]
Zimmerman

[11] Patent Number: 5,883,448
[45] Date of Patent: Mar. 16, 1999

[54] GAS-COOLED ELECTRIC MACHINE

[75] Inventor: Hans Zimmerman, deceased, late of Mönchaltorf, Switzerland, by Verena Zimmermann, Meinrad Werner Zimmermann, executors

[73] Assignee: Asea Brown Boveri AG, Baden, Switzerland

[21] Appl. No.: 962,687

[22] Filed: Nov. 3, 1997

[30] Foreign Application Priority Data

Nov. 2, 1996 [DE] Germany .................. 196 45 272.4

[51] Int. Cl.[6] .................................. H02K 9/10
[52] U.S. Cl. ....................... 310/52; 310/58; 310/59; 310/64
[58] Field of Search .............. 310/58, 59, 60 R, 310/60 A, 64, 52, 54

[56] References Cited

U.S. PATENT DOCUMENTS

| 953,574 | 3/1910 | Amsler | 310/52 |
|---|---|---|---|
| 2,695,368 | 11/1954 | Kilbourne | 310/52 |
| 2,746,269 | 4/1956 | Moody | 310/58 |
| 5,557,153 | 9/1996 | Zimmermann | 310/56 |
| 5,652,469 | 7/1997 | Boardman et al. | 310/58 |

FOREIGN PATENT DOCUMENTS

| 720154 | 3/1936 | Germany . | |
|---|---|---|---|
| 720154 | 4/1942 | Germany . | |
| 868176 | 2/1953 | Germany . | |
| 4332304 | 2/1995 | Germany | H02K 9/10 |
| 4332304A1 | 2/1995 | Germany . | |
| 214935 | 7/1923 | United Kingdom . | |
| 297467 | 11/1929 | United Kingdom . | |

OTHER PUBLICATIONS

"Development of Large Air Cooled Generators, etc.", Ruelle, et al., Cigre 1992 Session, p. 1–6.

*Primary Examiner*—Thomas M. Dougherty
*Assistant Examiner*—B. Mullins
*Attorney, Agent, or Firm*—Burns, Doane, Swecker & Mathis, L.L.P.

[57] ABSTRACT

In the case of an air-cooled electric machine with reverse cooling in the closed cooling circuit, a cooling arrangement is arranged in a foundation pit (10) underneath the machine and constructed in a modular fashion. It comprises a plurality of coolers (11) which are arranged independently of one another in the foundation pit (10) and separated from one another by separating walls extending perpendicular to the longitudinal direction of the machine. The outlet openings of the coolers (11) are freely connected to cold-gas chambers (14, 16) between the machine housing (1) and stator laminated core (2). The inlet openings of the coolers (11) are freely connected to the outflow spaces of the two fans (12) at the machine end faces. This design permits rapid exchange and/or shutdown of a cooler in addition to optimum guidance of cooling gas.

4 Claims, 4 Drawing Sheets

GAS-COOLED ELECTRIC MACHINE

BACKGROUND OF THE INVENTION

1. Field of the Invention

The invention relates to a gas-cooled electric machine as described in the preamble of the first claim.

A gas-cooled electric machine having these features is disclosed, for example, in DE-43 32 304 A1.

2. Discussion of Background

The principle of so-called indirect cooling is to dissipate the losses produced in the stator winding bars to the gaseous cooling medium (hydrogen or air). The principal heat flux takes place in this case from the bar copper via the insulation into the tooth region of the stator laminated core. The heat is dissipated to the cooling medium from the stator teeth.

The limits of the warming are prescribed in this case by the temperature sensitivity of the insulation and, moreover, by corresponding maximum temperatures which are fixed in standards by different insulation classes (ANSI, IEC).

Because of the relatively large temperature difference between the stator copper conductors embedded in the insulation and the outer layer of the insulation, the maximum power of an indirectly gas-cooled turbine-driven generator is limited by the classical cooling principle.

For this reason there has been no lack of proposals for improving the cooling, it being the case that these efforts have concentrated, on the one hand, on intensifying the cooling in the central machine region and, on the other hand, on a fundamental reconfiguration of the cooling circuit, specifically on a transition from conventional pressure cooling to reverse flow cooling, as is described, for example, in the CIGRE Report "Development of Large Air Cooled Generators for Gas Turbines and Combined Cycles", in particular FIG. 1 on page 11–201, 1992 Session 30 Aug.–5 Sep. 1992.

In general, by comparison with pressure cooling, reverse flow cooling offers the advantage that the air leaving the coolers can be fed directly to the cooling ducts in the stator and that the temperature increase caused by the machine fan is eliminated. It could be regarded as disadvantageous that the guidance of the cooling gas in the machine becomes more complicated overall because, in particular in the overhang space, it is necessary to provide additional built-in components, and supplying the rotor with cooling gas also becomes more difficult.

A further problem is the arrangement of the coolers in machines with relatively high specific outputs. Accommodating the coolers in the housing is scarcely possible without increasing the housing diameter.

SUMMARY OF THE INVENTION

Accordingly, one object of this invention is to provide a novel gas-cooled electric machine of the generic type named at the beginning, which can preferably operate using reverse flow cooling and be cooled in an optimum fashion.

This object is achieved according to the invention by means of the features of the first claim.

The advantages of the invention are to be seen, inter alia, in that the cooling arrangement is of modular construction and comprises a plurality of coolers which are arranged independently of one another in the foundation pit, and in that the outlet openings of the coolers are freely connected to the said cold-gas chambers and the inlet openings of the coolers are freely connected to the outflow space of the two fans.

Accommodating the coolers in the foundation pit renders it possible to utilize the entire space under the active part and under the two winding overhangs, without increasing the transport profile of the machine, which is of decisive importance, in particular, in the case of transport by rail. The cooler surface can be increased in this way by 50% or more.

It is provided in a particularly preferred embodiment of the invention that first recesses are provided in a side wall of the foundation pit, the coolers are arranged displaceably in the direction perpendicular to the longitudinal axis of the machine and are capable of being withdrawn or removed, in the manner of a drawer, to one side in a first direction through the said recesses, and the connecting fittings of the coolers are arranged on the side opposite the withdrawal side and are accessible through second recesses in the opposite side wall. This design permits a quick exchange of individual coolers in the case of periodic inspections or of a defect.

If the design is configured such that the outlet openings of the coolers are distanced from the cold-gas chambers, there is produced between the coolers and the machine a compensating space which extends axially over the entire length of the machine. This space is particularly advantageous when a cooler has failed. By covering the exit opening of the failed cooler, for example by means of a plate-shaped cover, it is possible to prevent hot cooling gas passing into the cold-gas chambers. With the remaining (intact) coolers in connection with the axial compensating space, the machine can then continue to be operated at reduced power.

The invention is particularly suitable for gas plants and combined plants in which the thermal machine(s) is or are set up on a plate-type foundation. In such plants, the foundation level of the turbine-driven generator is higher by 1000 and more millimeters than the foundation level of the thermal machine(s). If, here, the housing of the machine is mounted, with the interposition of a foundation, on the actual plate-type foundation of a thermal machine, the interior of the foundation serves as foundation pit. It is then very easy for the coolers to be moved out laterally for purposes of installation, servicing and repair, because the highest possible degree of accessibility is ensured.

BRIEF DESCRIPTION OF THE DRAWINGS

A more complete appreciation of the invention and many of the attendant advantages thereof will be readily obtained as the same becomes better understood by reference to the following detailed description when considered in reaction the accompanying drawings, wherein.

Only those elements which are essential for an understanding of the machine are shown.

DESCRIPTION OF THE PREFERRED EMBODIMENTS

Figure 1:
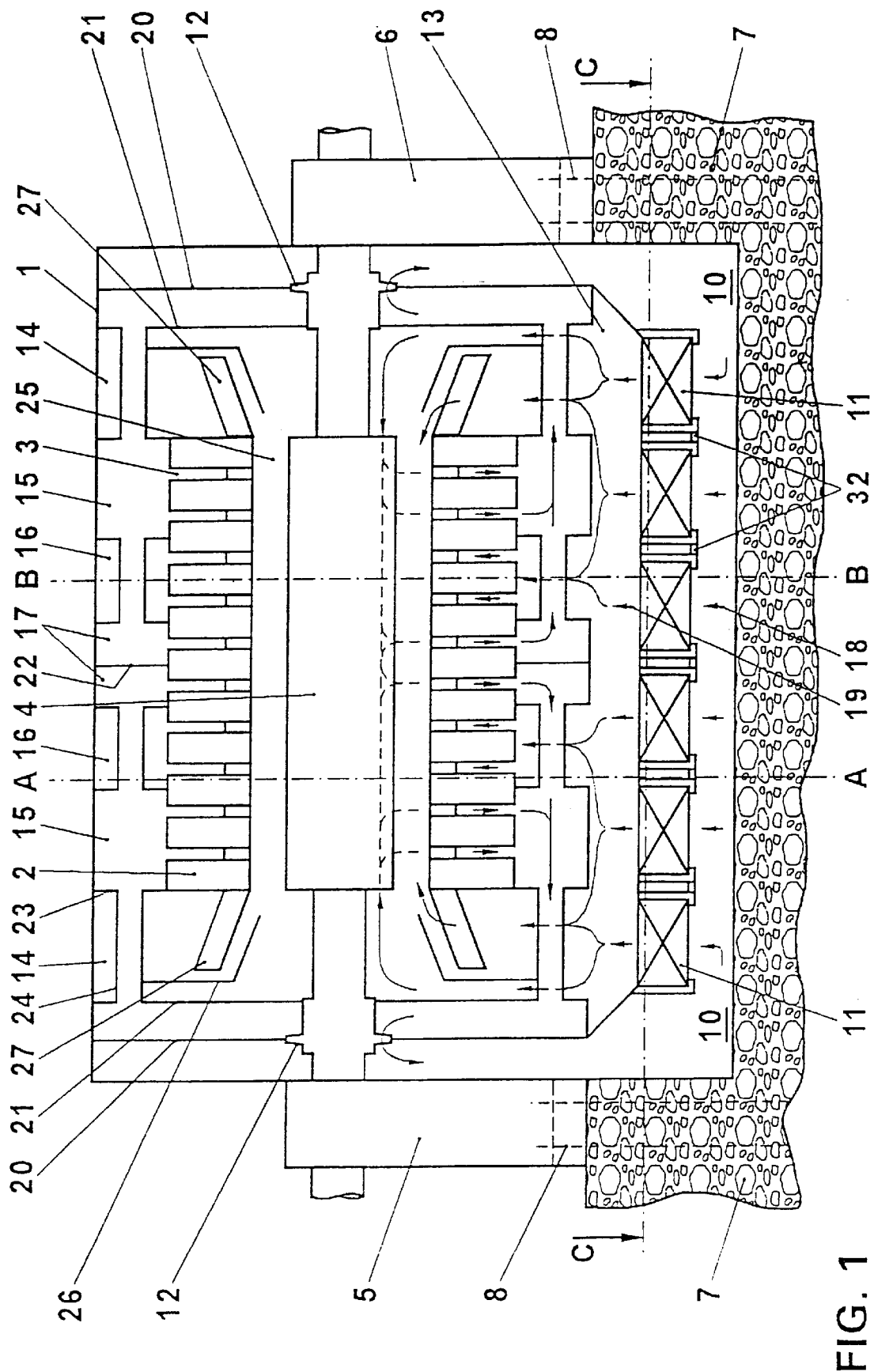
FIG. 1 shows a simplified longitudinal section through an air-cooled turbine-driven generator with a closed cooling circuit and with coolers arranged in the foundation pit.

Referring now to the drawings, wherein like reference numerals designate identical or corresponding parts through the several views, the air-cooled turbine-driven generator represented in FIG. 1 has a machine housing 1 which encloses the stator laminated core comprising component laminated cores 2. Radial ventilation ducts 3 are provided between the individual component laminated cores 2 in the stator laminated core. A rotor 4 is supported in pedestal bearings 5, 6 which are mounted on the foundation 7 by means of tie-bolts 8. The machine housing 1 is likewise mounted on the foundation 7 by means of tie-bolts 9 (compare FIGS. 2 and 3).

The foundation 7 has a foundation pit 10 which extends axially over the entire length of the machine housing 1 and occupies virtually the entire width of the housing 1. A cooling arrangement of the machine is arranged in this foundation pit 10. It is of modular construction and comprises in the case of the example six mutually identical coolers 11. They are arranged independently of one another in the foundation pit. In this arrangement, the inlet openings of the coolers 11 are connected to outflow spaces 36 of fans 12 arranged on both sides of the rotor 4, and the outlet openings of the coolers 11 open into a compensating space 13. The cooling gas flowing through the coolers 11 is represented by means of arrows, hot gas flowing in being denoted by 18 and cold gas flowing out by 19. All further arrows not denoted in more detail show the cooling circuit or the cooling gas. The cooling circuit is marked by arrows only in one machine half, since the machine is of symmetrical construction with respect to cooling.

The cooling principle is a so-called reverse flow cooling in which the hot gas 18 is fed to the coolers 11 by means of fans 12. Cold gas 19 then flows from the coolers 11 through the compensating space 13 into the rear of the machine, that is to say the space between the machine housing 1 and the stator laminated core constructed from component laminated cores 2. Hot-gas and cold-gas chambers 15, 17, 14 and 16 are formed in the rear of the housing by housing ribs 22 and radial and axial partitions 23 or 24. In the case of the example, there is one cold-gas chamber 14 at each of the two machine ends and one hot-gas chamber 17 in the center of the machine, as well as one hot-gas chamber 15 and one cold-gas chamber 16 each between the chambers 14 and 17 on both sides of the vertical middle of the machine.

In the compensating space 13, the cooling-gas flow is distributed between the cold-gas chambers 14 and 16, subflows being formed. A first subflow flows between baffles 26 and an inner fairing 21 directly to the rotor 4, a second flows through the winding overhang 27 into the machine air gap 25, and a third cooling-gas flow passes through the cold-gas chamber 16 and ventilation ducts 3 into the air gap 25. From the latter, the cooling-gas flow is extracted by the fans 12 through ventilation ducts 3 and the hot-gas chambers 15 and 17 between the inner fairing 21 and an outer fairing 20 and subsequently pressed to the coolers 11 in the foundation pit 10.

Figure 2:
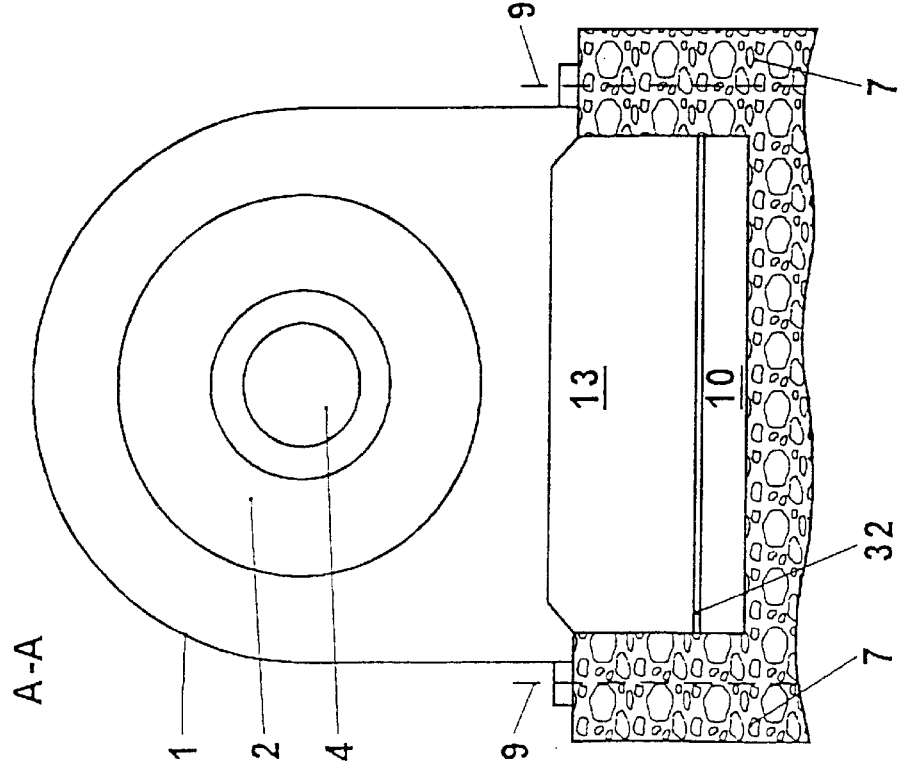
FIG. 2 shows a first cross-section through the turbine-driven generator according to FIG. 1 at the level between two coolers along the line AA.

FIG. 2 shows the arrangement of the machine on its foundation 7 in a cross-section according to the line AA in FIG. 1. Here, 32 denotes guide rails on which the coolers rest.

Figure 3:
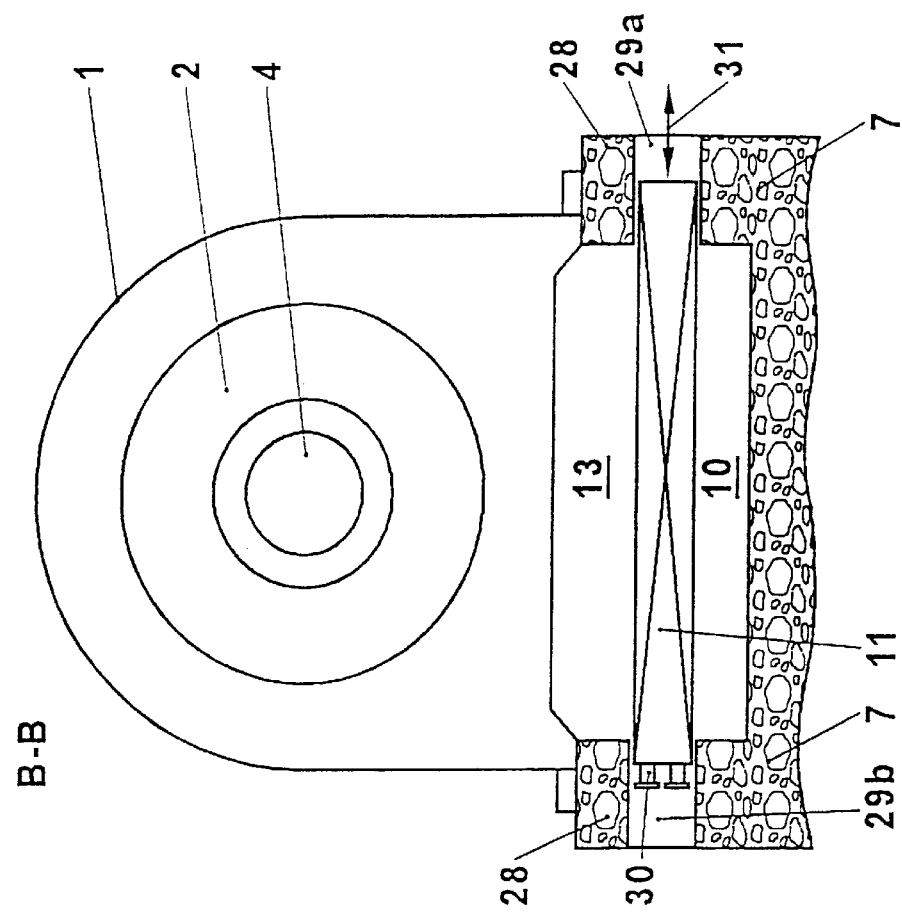
FIG. 3 shows a second cross-section through the turbine-driven generator according to FIG. 1 at the level of the cooler along the line BB.

FIG. 3 shows the coolers 11 arranged in recesses 29a, 29b of the side walls 28 of the foundation 7. The recesses 29a, 29b have the same cross-sectional form of the coolers 11, the latter being held in the recesses perpendicular to the machine axis. The cooler 11 is pushed in the manner of a drawer through the first recess 29a on the withdrawal side in the direction of displacement 31 into the space below the machine housing 1, in such a way that the connecting fittings 30 arranged on it project into the second recess 29b. Here, the cooler 11 is connected to further devices of a cooling system, which is not shown.

The coolers 11 and the guide rails 32 divide the space under the machine housing 1 into the compensating space 13 and the foundation pit 10 (compare FIG. 2 and FIG. 3). This design is advantageous, in particular, if a cooler has failed. By covering the outlet opening of the failed cooler, for example with a plate-shaped cover, hot cooling gas can be prevented from passing into the cold-gas chambers. The machine can then continue to be operated at lower power using the remaining (intact) coolers in conjunction with the axial compensating space 13.

Figure 4:
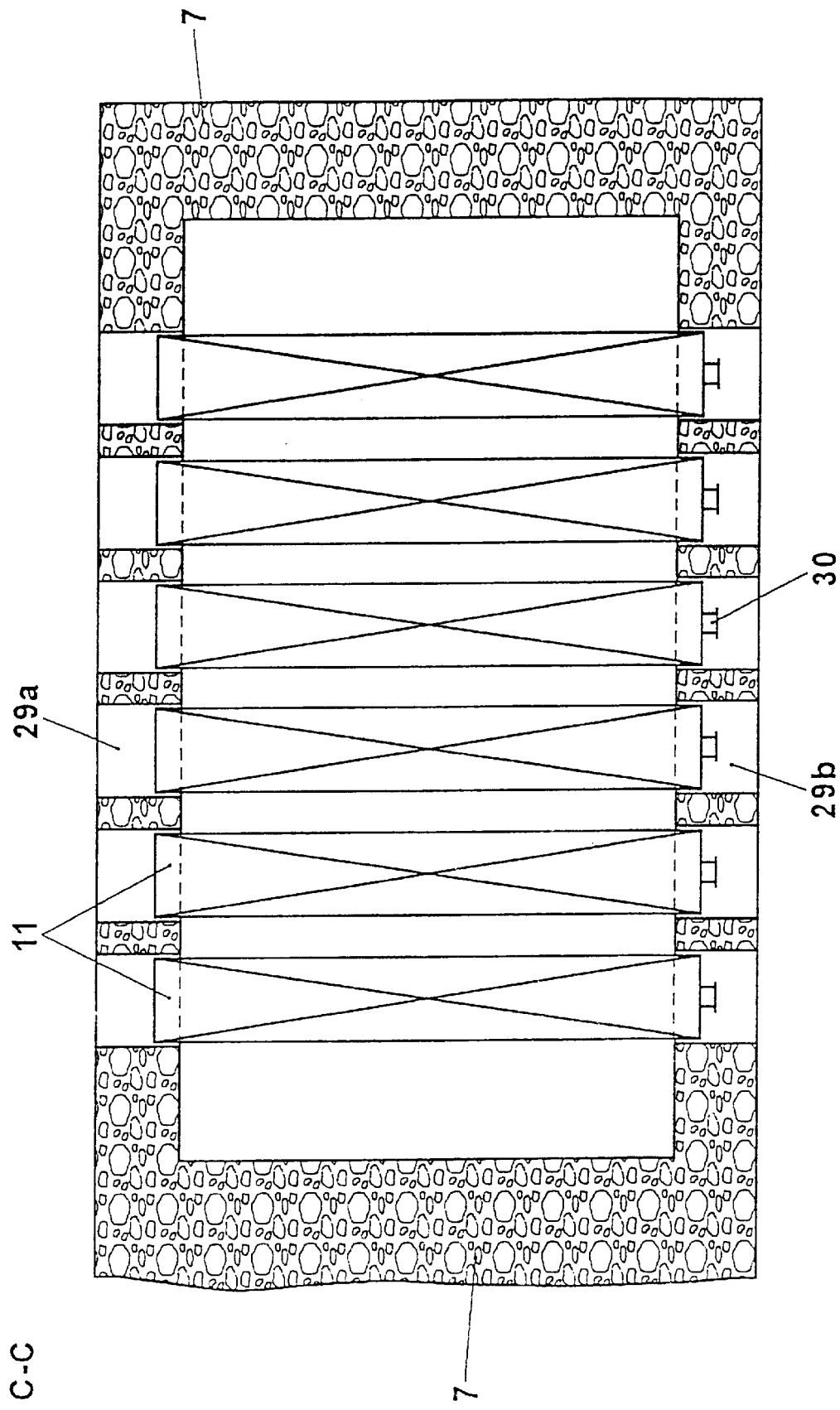
FIG. 4 shows a horizontal section through the turbine-driven generator according to FIG. 1 below the stator laminated core along the line CC.

The coolers 11 are represented in longitudinal sections through the foundation 7 in FIG. 4. As is also to be seen from FIG. 1, accommodating the coolers 11 in the foundation pit means that use is made of the entire space below the active part of the machine, that is to say the part of the machine between the winding overhang 27, including the latter. The transport profile of the machine is not enlarged thereby, which is of decisive importance for transport by rail. It is possible in this way to increase the cooling surface by 50% and more in comparison with the prior art.

Figure 5:
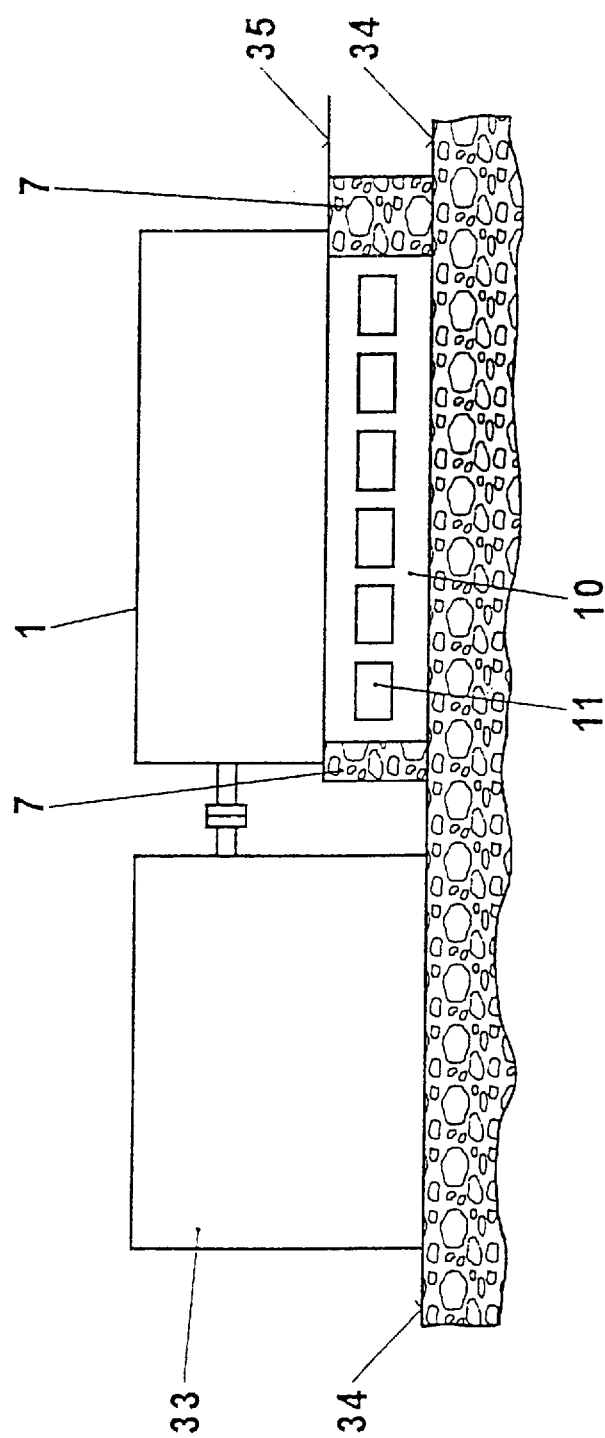
FIG. 5 shows a greatly simplified longitudinal section through a machine group comprising a thermal and an electric machine.

The invention is particularly suitable for gas plants and combined plants in which the thermal machine(s) 33, FIG. 5 is or are set up on a plate-type foundation 34. In such plants, the foundation level 35 of the turbine-driven generator is higher by 1000 and more millimeters than the plate-type foundation level 33 of the thermal machine(s) 33. If, here, the housing 1 of the machine is mounted, with the interposition of a foundation 7, on the actual plate-type foundation 34, the interior of the foundation 7 serves as foundation pit 10. It is then very easy for the coolers 11 to be moved out laterally for purposes of installation, servicing and repair, because the highest possible degree of accessibility is ensured.

The invention was explained above with the aid of a gas-cooled machine having three hot-gas chambers and four cold-gas chambers, the latter being fed with cooling gas from six coolers. Of course, the invention can also be realized in the case of machines having a different number of hot-gas chambers, cold-gas chambers and coolers. If appropriate, all that is then required is for the cooling gas to be guided in a changed way by means of housing ribs and radial and axial partitions in the rear of the machine.

Obviously, numerous modifications and variations of the present invention are possible in light of the above teachings. It is therefore to be understood that within the scope of the appended claims, the invention may be practised otherwise than as specifically described herein.

What is claimed and desired to be secured by Letters Patent of the United States is:

1. An electric machine comprising: a housing arranged over a foundation pit and mounted on a foundation a stator arranged in said housing having indirectly cooled stator winding conductors arranged in slots on the inner circumference, and having a rotor, the laminated core of the stator being constructed from individual component laminated cores spaced apart from one another by duct spacers and the interspaces between two successive component laminated cores forming radially extending cooling slots, and the cooling slots connecting annular air gap spaces on the inner circumference of the stator laminated core to chamber spaces which are situated between the outer circumference of the stator laminated core and the housing, which chamber spaces comprise cold-gas chambers to which cold cooling gas is applied, and which chamber spaces comprise hot-gas chambers into which heated cooling gas flows, directed radially outwards, from the said cooling slots, which hot-gas chambers are connected to a cooling arrangement in the foundation pit underneath the machine, and there being provided at both machine ends fans and cooling gas guiding devices which extract the heated cooling gas from the hot-gas chambers and feed the cooled gas as cold gas to said cold-gas chambers, an overhang space, and the rotor, wherein the cooling arrangement comprises a plurality of coolers which are arranged independently of one another in the foundation pit, and wherein the air outlet openings of the coolers are in fluid communication with said cold-gas chambers and the air inlet openings of the coolers are in fluid communication with an outlet space of the two fans and wherein first recesses are provided in a side wall of the foundation pit, the coolers are arranged in said first recesses to be displaceable in the direction perpendicular to the longitudinal axis of the machine and are capable of being withdrawn or removed to one side in one direction through the first recesses, and connecting fittings of the coolers are arranged on the side opposite said one side and are accessible through second recesses in the opposite side wall of the foundation pit.

2. The machine as claimed in claim 1, wherein the outlet openings of the coolers are separated from the cold-gas chambers by a space, said space serving as a compensating space.

3. The machine as claimed in claim 1, wherein the housing of the machine is mounted on a foundation, the interior of the foundation forming a foundation pit.

4. The machine as claimed in claim 1, wherein said cooler air outlet openings can be sealed individually by plate-shaped elements to shut down each said cooler.

* * * * *